United States Patent

[11] 3,559,611

| [72] | Inventor | Walton W. Cushman |
| | | Webb City, Mo. |
| [21] | Appl. No. | 713,160 |
| [22] | Filed | Mar. 14, 1968 |
| [45] | Patented | Feb. 2, 1971 |
| [73] | Assignee | Martin Tucker, as trustee |
| | | New York, N.Y. |

[54] AMPHIBIOUS VEHICLE
16 Claims, 21 Drawing Figs.

[52] U.S. Cl. ................................................. 115/1
[51] Int. Cl. ................................................. B63f 3/00
[50] Field of Search ...................................... 115/1;
305/20; 180/9.62, 9.64, 9.5, 9.2; 280/106.5;
114/174; 220/41

[56] References Cited
UNITED STATES PATENTS

| 2,201,507 | 5/1940 | Stilwell | 220/41X |
| 2,551,750 | 5/1951 | Liskey | 114/201 |
| 2,551,982 | 5/1951 | Verkins | 280/106.5X |
| 2,708,978 | 5/1955 | Robitaille. | |
| 2,967,507 | 1/1961 | Schulz | 115/1 |
| 3,107,924 | 10/1963 | Cushman | 305/20X |
| 3,120,832 | 2/1964 | Buisson | 115/1 |
| 3,276,823 | 10/1966 | Tucker | 305/11 |
| 3,308,783 | 3/1967 | Gay et al. | 115/1 |

*Primary Examiner*—Andrew H. Farrell
*Attorney*—Lon H. Romanski

ABSTRACT: A lightweight, high-performance amphibious vehicle with both off-road and highway operational capability, the vehicle including a body with variable flotation means for operation over water, front steerable suspension and running gear means with reset steering and rear circumferentially loaded and snubbered hubless wheel suspension and locomotion means.

PATENTED FEB 2 1971

WALTON W. CUSHMAN
INVENTOR.

BY Walter Patoreko, Jr.
ATTORNEY 3,559,611

AMPHIBIOUS VEHICLE

BRIEF SUMMARY OF THE INVENTION

This invention relates generally to vehicles, and more particularly to an improved lightweight, multipurpose amphibious vehicle adapted for locomotion by hubless wheel apparatus such as that disclosed in my prior U.S. application Ser. No. 684,141 filed on Nov. 20, 1967.

There has been and presently is considerable effort toward the development of various specialized on and off road vehicles, such as what are commonly referred to as snowmobiles, icemobiles, sand buggies, prospector and exploration "go anywhere" type vehicles, sportman's carriers, golf carts, etc., including military vehicles intended for combat operations over any kind of terrain, including deep slurry mud and water.

It is considered that such diverse development and manufacture of separate specialized vehicles is a wasteful and unnecessary duplication of effort, Further, a deficiency common to such vehicles is that the performance capabilities of each is unduly limited. For example, various individual vehicles of this general type are characterized by deficiencies such as poor steering response, poor suspension system resulting in a hard ride, excessive ground pressure, lack of amphibious capability, trailering to location of use required, difficulty and expense of maintenance and service, and excessive initial and operational costs.

Despite this duplicated effort, certain specialized vehicles, such as snowmobiles and golf carts, for example, are enjoying a substantial degree of commercial success. It would seem to be an obvious observation that a single multipurpose vehicle providing all of the required performance capabilities over any hard or soft terrain, including snow, ice, mud and water, would expand the usefulness of such vehicles in meeting man's needs in all seasons of the year and provide exceptional competitive advantages to its manufacturer in attempting to capture this relatively new and rapidly expanding market.

It is further contemplated that a vehicle of the type proposed can comprise a single basic design with various optional features, including various power-package modes such as, for example, (a) gasoline-mechanical with recoil starter and simple power train, (b) gasoline-electric with battery and electric starter or (c) battery-electric, the latter version being particularly desirable, in view of current exhaust emission regulations, as a more useful "second car."

Accordingly, a main object of the invention is to provide a single simplified amphibious vehicle construction that is operationally efficient over an exceptionally broad range of terrain surface conditions, including water, soft mud, sand, snow and ice, as well as over hard nondepressible smooth or rough terrain and terrain that is in the "twilight zone" between land and water.

Another object of the invention is to provide such a vehicle that is not necessarily limited to but particularly suited for locomotion by hubless wheel apparatus such as that disclosed in my above referenced prior application Ser. No. 684,141.

Another object of the invention is to provide alternate means for hermetically sealing such hubless wheel locomotion apparatus.

Still another object of the invention is to provide such a vehicle having novel integrated front steering, suspension and running gear means.

Another object of the invention to is to provide steering gear having a control position reset feature.

A further object of the invention is to provide such a vehicle having front running gear convertible from one mode to another.

Another object of the invention is to provide such a vehicle having a novel and simple power train.

A still further object of the invention is to provide such a vehicle having a body that is of a lightweight, essentially-unitized construction easily convertible for operation over water and having additional means for variably increasing the buoyancy thereof.

Another object of the invention is to provide simple and inexpensive means for at times variably changing the buoyancy of any marine vehicle, such as a boat having a water displacing hull, for example, whereby the buoyancy thereof can be increased wither prior to use of in the event of an emergency.

A further object of the invention is to provide novel, sealed door closure means for such a vehicle to alternately adapt the of for travel over land or water.

Another object of the invention is to provide a vehicle having a body with inherent means complementing any other suspension means so as to contribute to a softer ride.

These and other objects and advantages of the invention will become more apparent upon reference to the following detailed description and the attached drawings.

BRIEF DESCRIPTION OF THE VARIOUS VIEWS OF THE DRAWINGS

FIG. 7 is a cross-sectional view taken on the plane of line of 7–7 of FIG. 1, looking in the directions of the arrows;

DETAILED DESCRIPTION

Figures 1, 2, 2A, 3:
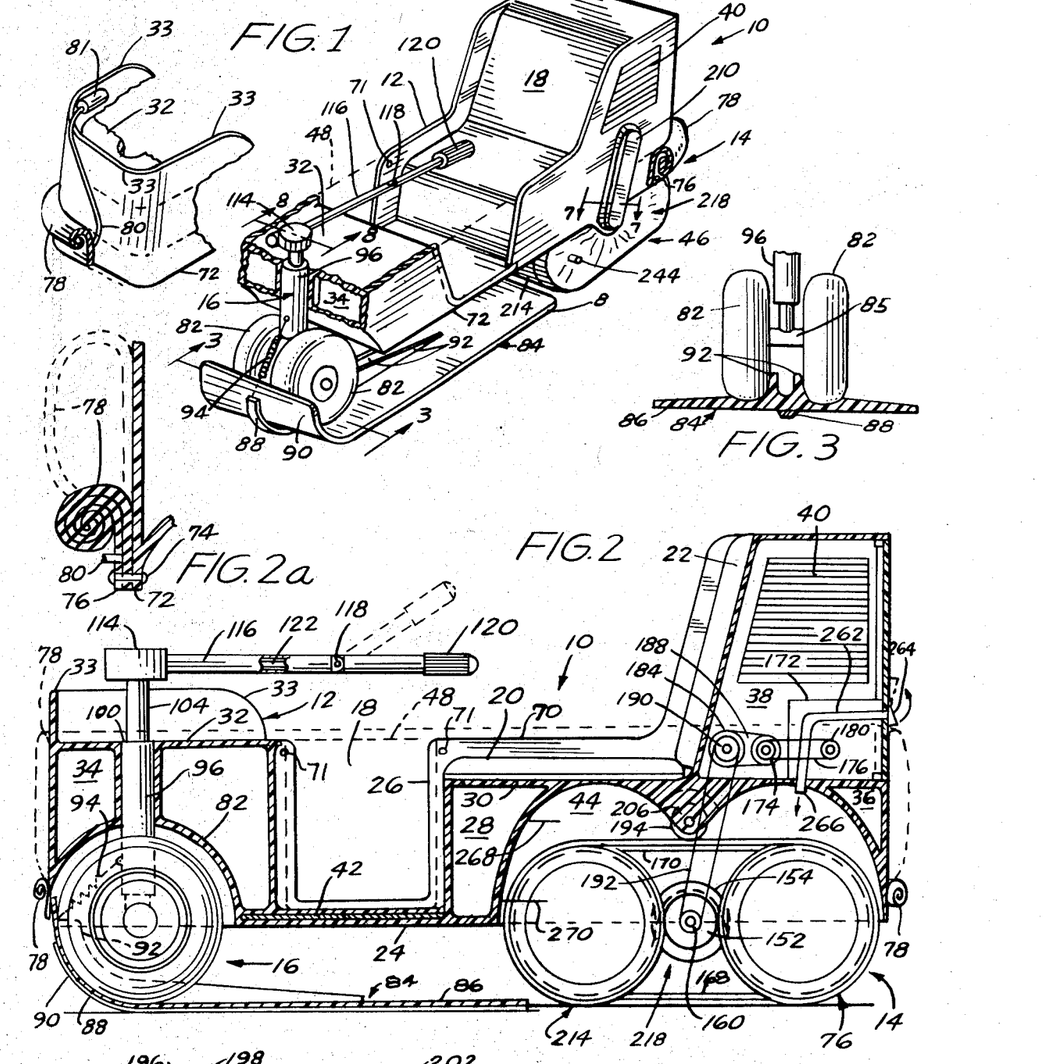
FIG. 1 is a persepective view, with a portion thereof shown broken away, of a vehicle embodying the invention.
FIG. 2 is an enlarged side elevational view, with portions thereof broken away to expose internal constructions.
FIG. 2a is a further enlarged fragmentary view illustrating in greater detail the left a end portion of FIG. 2.
FIG. 3 is a cross-sectional view taken on the plane of line 3–3 of FIG. 1, looking in the direction of the arrows.

Referring now to FIGS. 1 and 2 of the drawings in greater detail, a vehicle 10 embodying the invention, generally comprises a body 12, a power train and tracklike rear locomotion apparatus means 14 and a steerable front suspension and running gear means 16. While the invention is not so limited, the body 12 preferably comprises, in order to complement the lightweight structure of the novel front running gear 16 and power train and locomotion apparatus 14, a unitized structure formed from any suitable lightweight and durable material, such as fiberglass-epoxy. Further, the body 12 may be formed, as shown by FIG. 2 wherein the body side panel is cut away, to provide an open single or multiple passenger compartment 18 having a removable seat 20 and seat back 22, a floor 24, door openings 26, an underseat storage compartment 28 having an access opening 30, a convenient tray 32 with vertical sides 33, sealed flotation compartments 34 and 36 and an engine and power train compartment 38 having louvered ventilation at 40.

In FIG. 1, the front end tray section of the body is shown broken away to expose portions of the front steering and running gear means 16. Other novel open or closed body configurations may be employed, and other materials could be used, as desired. It should be noted, however, that in the embodiment shown, the door openings 26 extend substantially to the floor 24, thereby providing a body floor portion capable of bending. Such a flexing section, particularly if reinforced by a longitudinal steel or other spring element 42 (see FIGS. 2 and 13), complements the other vehicle suspension means and provides a softer ride for passengers or cargo.

It should be noted further that the body 12 is formed with a closed top-open bottom compartment 44 housing the upper portion of the tracklike hubless wheel locomotion apparatus 46, for advantageous purposes to be described.

Figures 4, 6, 8, 9, 10, 11, 12, 13:
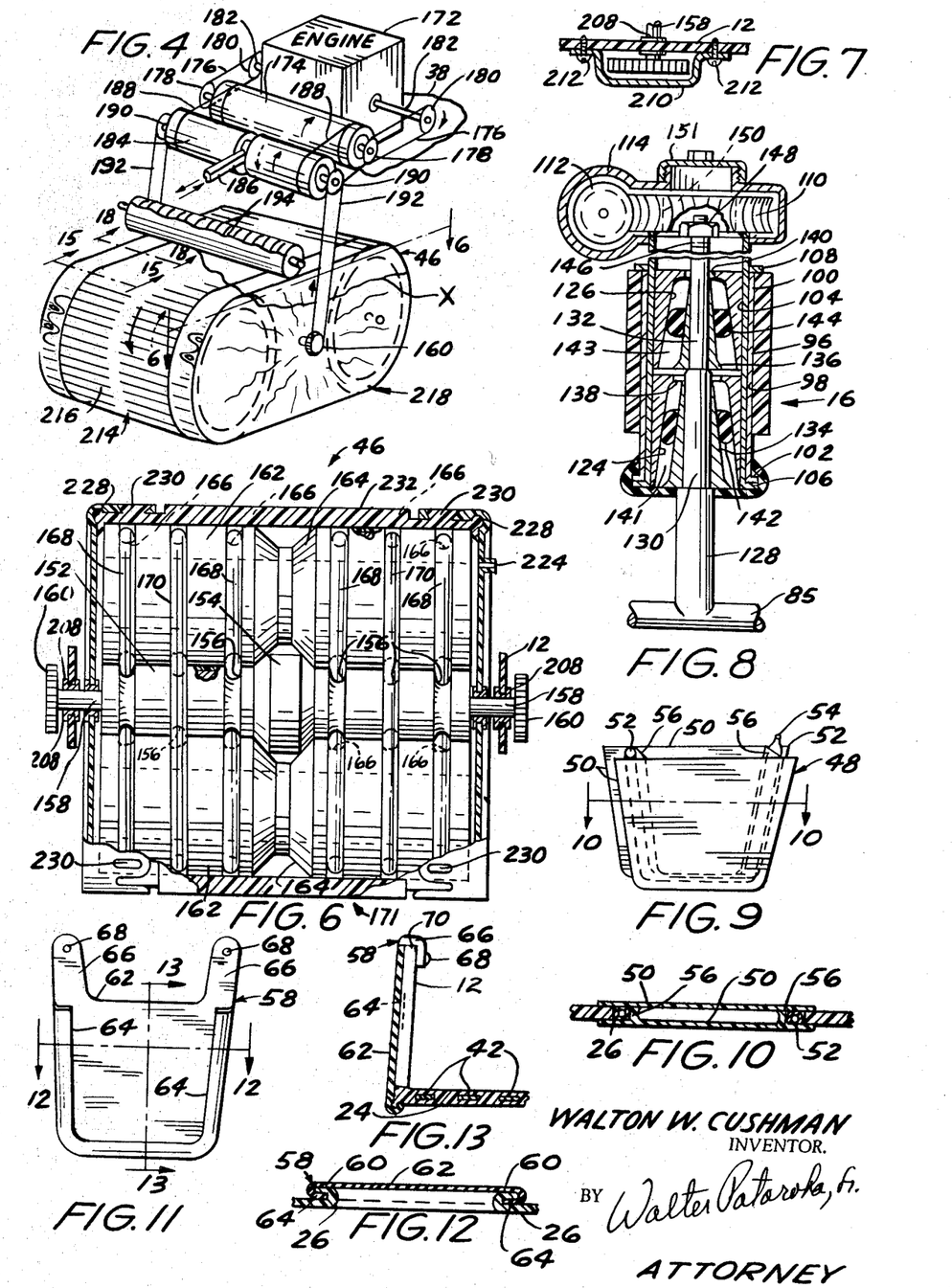
FIG. 4 is a perspective view of only the power train and locomotion apparatus shown by FIGS. 1 and 2.
FIG. 6 is an enlarged top plan view taken on the plane of line 6–6 of FIG. 4, looking in the direction of the arrows and with the tread belt and sealing means removed.
FIG. 8 is a cross-sectional view taken on the plane of line 8–8 of FIG. 1, looking in the direction of the arrows.
FIG. 9 is a perspective view of a door construction for vehicle.
FIG. 10 is a cross-sectional view of the door shown by FIG. 9, taken on the plane of line 10–10 of FIG. 9, but with the door positioned on the vehicle.
FIG. 11 is a side elevational view of an alternate door construction.
FIGS. 12 and 13 are cross-sectional views taken on the planes of lines 12–12 and 13–13, respectively, of FIG. 11, but with the door positioned on the vehicle.
Figure 5:
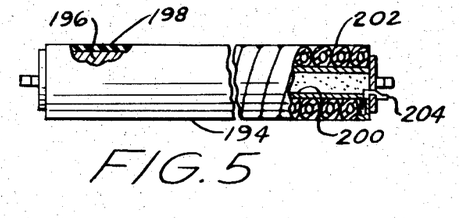
FIG. 5 is a side elevational view, with portions thereof broken away, illustrating alternate constructions of an element shown by FIG. 4.

FIGS. 9 and 10 illustrate a novel removable fiberglass door 48 particularly adapted for sealably closing each of the door openings 26 when it is desired, for example, to ready the vehicle 10 for travel over water. The door 48 may comprise panels 50 spaced a distance equal to the thickness of the body at the door openings 26 and having therebetween an elastomeric tube 52 inflatable through a valve 54, the tube 52 being supported by a wall, which may comprise an integral rib 56 having a shape mating with the shape of the door opening 26. Thus, the door 48 may first be assembled in the door opening, as shown by FIG. 10, with the tube 52 between the edges of the door opening 26 and the rib 56, and the tube then inflated so as to provide a watertight seal between the door 48 and the body of the vehicle. Other novel door configurations are possible, the main feature of the removable door 48 being the pressure seal provided by the inflatable tube 56.

FIGS. 11—13 illustrate a modified door construction 58 particularly adapted for use with a vehicle body having a flange 60 around the door opening 26. The door 58 is shown as comprising a panel 62 having an elastomeric flange 64 and straps 66 having snap fittings 68. The door 58 can thus be pulled upwardly, with the flange 64 sealably compressed under the flange 60, and the door secured by stretching the straps 66 over the top edge 70 of the vehicle body 12 adjacent door openings 12 and engaging the fittings 68 with cooperating fittings 71 on the inner surface of the body.

With the sealed doors 48 or 58 in place, the vehicle body 12 comprises a boatlike water-displacing hull having buoyancy for over water travel, the top edge 70 of the body and the louvers 40 being above the waterline.

Referring now to FIGS. 1, 2 and 2a, the body 12, which is convertible to a hull as described above, may have secured near the entire bottom edge 72 thereof, as by rivets 74 or by any other suitable permanent or detachable means, the lower edge 76 of a preferably endless tough elastomeric tube 78 inflatable through a suitable pneumatic tire type valve or conduit 80. The tube 78 is either formed or provided with means such that when not inflated it assumes a compact rolled-up position, as that shown in solid lines in FIGS. 1—2a, in which position it could act as a protective bumper. However, when a fluid under pressure, such as air in pressurized container 81 or engine exhaust, is introduced through a conduit or valve 80, the tube 78 uncoils and inflates substantially to the condition shown by dotted lines in FIGS. 2 and 2a. This provides an always attached and readily inflatable inflatable flotation collar all around the body or hull 12, the collar 78 being pressed against the body 12 when the vehicle is in the water to increase buoyancy of the vehicle whenever desired, as in the case of an emergency, and to increase its stability in the water by increasing its waterline dimensions. Such an attached, compact, normally-rolled-up or otherwise semistored, puncture and wear resistant inflatable element 78 would be applicable to and desirable for any water craft, such as a boat, to provide additional or emergency buoyancy and stability and to act as a bumper for docking. In the case of a boat, the design and location could be arranged to suit.

FIGS. 1, 2, 3 and 8 illustrate the front steerable, integrated suspension and running gear means 16. In regard to this structure, it will be noted first that the running gear 16 is shown as being convertible between wheels 82 on an inverted T mounting 85 and a removable ski 84. The front running gear may comprise dual pneumatic tires and wheels 82 or a single wheel of any appropriate low pressure design suitable for the intended vehicle use.

The ski 84, which is shown is as constructed from a material similar to that of the body 12 but which can be made of any suitable material, is shown as comprising a main body portion 86 with a rib 88, a leading portion 90 curved essentially on the radius of the wheels 82 and a pair of central reinforcing ribs 92 spaced so as to fit tightly between the wheels 82, thus providing stability for steering. The ski 84 would be assembled, for example, by running the wheels 82 to the radiused front of the ski, straddling the ribs 92, and suitably attaching the spring 94 between the movable front of the ski and the stationary tubular member 96.

It should be apparent that while modifications may be made in the ski and ski attachment, the convertible feature shown and described lends further to an ultimate object of the invention, a multipurpose vehicle of basic design with optional feature capability. The possibility of using other types of running gear is, of course, not precluded.

The integrated steering and suspension system for the front running gear comprises the outer tubular member 96 which is fixedly secured to the body 12, as in the passage 98, the upper end 100 of the tube 96 being aligned with the top surface of the shelf 32 and the lower end thereof having a flange 102. An inner tubular member 104 is disposed in the tubular member 96, the member 104 being restrained against axial movement within the member 96 by flanges 106 and 108, but freely rotatable therein.

The rotatable inner tube 104 extends upwardly beyond the shelf 32 any desired distance, and it has secured to the upper end thereof the circular worm follower gear 110, which is in mesh with a conventional hourglass worm gear 112 journaled in a conventional manner for rotation in the housing 114 for the worm and follower gear assembly. The housing 114 is itself free to rotate on the upper end of the inner tube 104 and has fixedly secured thereto the tubular tiller steering member 116, which may be hinged, as at 118, and fitted with a rotatable handle 120 at the free end thereof. A flexible drive cable 122 is connected between the handle 120 and the worm gear 112.

Thus, if the handle 120 is rotated, the worm gear 112 is rotated, which rotates relatively slowly the worm follower gear 110 and the inner tube 104 connected thereto. On the other hand, if the tiller 116 is swung horizontally right or left without rotating handle 120, as for normal steering, the housing 114 and the inner tube 104 will be rotated directly in either direction at a relatively more rapid rate because the worm gear 112 is journaled in the housing 114 and in mesh with the follower gear 110 which is secured to the tube 104.

Having described how rotation of the inner tube 104 is accomplished, the operative connection between the tube 104 and the inverted T mounting 84 will be now be explained. It will be noted that the inner tube 104 has press fit or otherwise fixedly secured or formed therein a pair of female tapered sleeves or portions 124 and 126. The vertical member 128 of the T mounting 85 is formed with reduced diameter portions 130 and 132 on which are press fit or otherwise fixedly secured or formed male tapered or conical sleeves or surfaces 134 and 136, respectively. The axial circular openings 138 and 140 in the female sleeves or portions 124 and 126, respectively, are of sufficient diameter so that the conical male sleeves or surfaces have sufficient freedom of axial movement and so that the larger diameter portion of sleeve or surface 136 can pass through opening 138 on assembly.

It will be noted that elastomeric doughnut rings 142 and 144, which may have any desired specific dimensions and physical characteristics, are assembled, with any desired degree of initial compression, in the clearances 141 and 143 between the respective adjacent male and female sleeves or surfaces, the rings being secured against inadvertent removal by constriction of clearances 141 and 143 due to outward flaring of the male sleeves at the bottom and inward flaring of the female sleeves at the top.

The upper free end of the member 128 may be threaded at 146 and fitted with a nut 148 larger than the opening 140 to serve as a stop, and, if necessary, depending upon the height of the inner tube 104, the gear 110 may be formed with a central opening 150 to prevent interference with threaded end 146 and permit access to the nut 148 through the threaded opening in housing 114 closed by cap 151.

It will thus be seen that the compressed rings 142 and 144 serve the dual functions of (a) friction steering means wherein member 128 is rotated when the inner tube 104 is rotated and (b) increasing-spring rate suspension means between the vehicle 10 and its front running gear, wheels 82 or ski 84. The greater the axial displacement due to road shock, the progressively greater will be the restoration forces generated by the corresponding deformation of the doughnut rings.

It will be apparent, then, that normal steering is accomplished by operation of the tiller 116 and that rotation of the handle 120 provides a means for resetting the tiller. Thus, the vehicle 10 is characterized by 360° tiller steering, with reset capability so as to be operable from any seat position and/or from outside the vehicle, as when the operator may be walking alongside.

It has been previously stated that a vehicle 10 embodying the invention is particularly adapted to employ the hubless wheel suspension and locomotion apparatus disclosed in my earlier U.S. application Ser. No. 684,141, wherein numerous embodiments thereof where shown and described. By "-hubless" it is, of course, meant that the operation of or the load carrying capabilities of the wheels or rollerlike elements 162 is not dependent upon the existence of a centrally disposed load transmitting axle or axes passing through and functioning as a hub about which such wheels 162 respectively revolve. While a particular locomotion apparatus, including two modifications of tread belt sealing means, are disclosed herein for purposes of illustration, no limitations are intended in this respect insofar as the vehicle 10 is concerned, and any suitable apparatus may be employed. In fact, certain features of a vehicle 10 embodying the invention may be employed even in the absence of the locomotion apparatus referred to.

Referring now to FIGS. 2, 4 and 6, it will be seen, for example, that the rear locomotion apparatus 46 may comprise an assembly including an elastomeric lagged main load and power input hub 152 formed with a central tracking flange 154, belt grooves 156 and end shafts 158 fitted with chain drive gears 160. Hubless or surface locomotion wheel elements 162, each preferably elastomer lagged and having a central tracking flange groove 164 and belt grooves 166, are disposed on opposite sides of and in engagement with the hub 152. The grooves 156 and 166 are fitted with endless load belts 168 passing around the surface locomotion wheels 162 and under the hub 152 and endless snubber or tensioning belts 170 passing around the elements 162 and over the hub 152, as and for the purpose described in my prior application Ser. No. 684,141. The apparatus 46 further includes a sealed tread belt assembly 171, which will be described later in detail.

It will be appreciated that operation of the apparatus 46 involves two principle types of frictional forces, one being the direct engagement rolling friction between the main power input hub 152 and each of the surface locomotion wheels 162 and the other being the belted friction of the load and snubber belts 168 and 170. The wrap of each of the belts is approximately 180° on the main load hub 152 and in excess of 270° on the surface locomotion wheels 162, and the downward force of the suspended load acting through the load belts 168 causes each of the surface locomotion wheel 162 to be forced into direct rolling engagement with the main load hub 152, under a force of up to one-half of the suspended load, which can be substantial. It will thus be apparent that the rolling friction increases with the load.

It will be noted further that while no single belt 152 or 162 completely encircles any single surface locomotion wheel 162, the opposite application of the load and snubber belts, under and over the load hub 152, results in the application of circumferential loading and/or snubbing substantially a full 360° around the surface locomotion wheels. Thus, for each combination of one load 168 and one snubber 170 belt, there is on the order of 540° of total circumferential loading and snubbing on each surface locomotion wheel 162. This action of the snubber belts on the surface locomotion wheels, in opposition to the action of the load belts, is referred to herein as "reaction" snubbing, and, upon increasing loads or impact, it may approach or reach "hoop" effect proportions. This hoop effect increases the circular rigidity of the hollow, inherently deformable surface locomotion elements 152, which, in turn, increases their spring rate so as to compensate for the increased load and/or impact.

In self-propelled apparatus 46 rotation of the driven load hub 152 drives the hubless or surface locomotion wheels 162 by rolling friction between the hub and the hubless wheel, which increases with the load, and the circumferential load-induced friction of the load belts 168, and/or the snubber belts 170, as previously explained. That is, while the primary purpose of the snubber belts 170 is to retain the apparatus 46 in the assembled condition, by virtue of bottom runs thereof passing over the top of the main load hub 152, they are also essentially additional propulsion or power transmitting elements are so employed.

There must always be at least one snubber belt 168, but mixed load and snubber belts, with an equal number of each on each side of the central tracking flange 154, provide good mechanical symmetry and are preferred where the additional propulsion or braking forces offered by additional snubber belts may be desired.

It should be noted that the rotatable vehicle load and power input hub 152 is compressively wedged between the two hubless wheels 162 to provide two areas of rolling friction, each contributing substantially to the total internal drive friction which can be developed in self-propelled applications.

Where a tread belt 171 is employed in a self-propelled apparatus 46, the total friction between the hubless wheels 162 and the inner surface of the endless tread belt is generally much greater than the friction between the tread belt and the road or terrain over which the vehicle is traveling. In the preferred construction, hubless wheels 162 with an elastomeric outer surface, as shown in FIG. 6, are employed with an elastomeric tread belt 171, and the friction therebetween is more than adequate to prevent slipping of the hubless wheels within the tread belt. Further, the enormous friction area resulting from the full 180° wraparound of the tread belt 171 on each hubless wheel element 162 enhances the frictional forces, it being noted that the tread belt wrap is never less than 180° and can be somewhat more. It should also be noted that both hubless wheel elements 162 are independently powered, with the result that the tread belt 171 transmits no belt power, per se. It should be further noted that the traction-generating element, the tread belt 171, is totally divorced from the basic load supporting elements, thus permitting the use of a simple, low-cost, easily field replaceable tread element, which will obviously be the 1. component to wear as the result of roadway abrasion. The tread belt may or may not be fabric reinforced, as performance requirements dictate.

2. is believed that the above description of the locomotion apparatus 46 is a sufficient disclosure of a circumferentially loaded and snubbered hubless wheel rear suspension and locomotion means that may be employed for a self-propelled vehicle 10.

FIGS. 1, 2 and 4—7 illustrate the power train driving the locomotion apparatus 46 just described. The power plant, shown here as a gasoline engine 172, is mounted in any suitable manner in the engine compartment 38. However, as stated earlier, the engine 172 could be any power plant such as a battery powered electric motor.

A first roller element 174, which may be of any suitable construction, but preferably lagged with an elastomer in a manner similar to hub 152, is rotatably mounted by any suitable means on a fixed axis adjacent the engine 172 and driven, preferably at both ends thereof, by belts 176 running on pulleys 178 and 180 mounted on the ends of the roller 174 and the engine drive shaft 182.

A second lagged roller 184 is rotatably mounted on a movable axis adjacent and parallel to the first roller 174, and any suitable means 186 being provided to move and lock the roller 184, either to a position spaced from roller 174, as shown, or into engagement with roller 174. Spaced drive belts 188 are provided for the rollers 174 and 184. Roller 184 is fitted at the ends thereof with pulley or preferably chain drive gears 190, and Morse drive chains 192 are mounted on gears 190 and similar gears 160 fitted at the ends of hub 152 of the locomotion apparatus 46.

A third free roller 194 is rotatably mounted in the chamber 44, preferably in contact with the tread belt of the locomotion apparatus 46, or with the snubber belts 170 if a tread belt is not employed. Roller 194 may comprise any suitable core 196 lagged with an elastomer 198, as shown in the left-hand portion of FIG. 5, or any suitable inner core 200 having wound thereon a continuous elastomeric tubing 202 inflated through a valve 204. Roller 194 prevents the entire locomotion apparatus 46 from rotating about the axis of hub 152 and into rubbing engagement with the upper walls of compartment 44, as it could do when traversing water. That is, roller 194 restrains such rotation in either direction of operation of the locomotion apparatus 46, without interfering with the operation thereof.

Rollers 174, 184 and 194 and hub 152 may be rotatably mounted in bosses (not shown), such as bosses 206 for roller 194, formed in the body 12, and in any suitable bearings, such as bearings 208 for hub 152.

Gears 160 and 190 and chain 192 preferably run in oil contained within the cover 210 secured by bolts 212 to the body side panel, as shown in FIGS. 1 and 7.

In the spaced post position of the rollers 174 and 184 shown in FIG. 4, engine 172 drives the roller 174 through the belts 176, roller 174 drives roller 184 through the belts 188 and roller 184 drives hub 152 through the chains 192, as shown by the solid arrows, for forward locomotion. However, when roller 184 is moved into engagement with roller 174, the drive belts 188 cannot drive, and the mechanism from the roller 184 to the hub 152 is in reverse drive.

While the vehicle 10 is not limited to any particular power train, the arrangement described above provides a very simple and efficient friction belt forward drive and friction roller reverse drive, with a positive chain drive to the load hub 152 of the hubless wheel locomotion apparatus 46.

The circumferentially loaded and snubbered hubless wheel locomotion apparatus 46 described with reference to FIG. 6 is suitable for operation without a tread belt under certain conditions. However, a tracklike apparatus having an exceptionally large footprint area, resultant low unit ground pressure and terrain sensing capability is provided by use of a tread belt, as shown in FIGS. 1, 2, 4 and 6. Further, the apparatus 46 may be hermetically sealed to prevent the entry of foreign material and to provide a buoyant apparatus for travel over water.

Figures 14, 15, 16, 17, 19, 20:
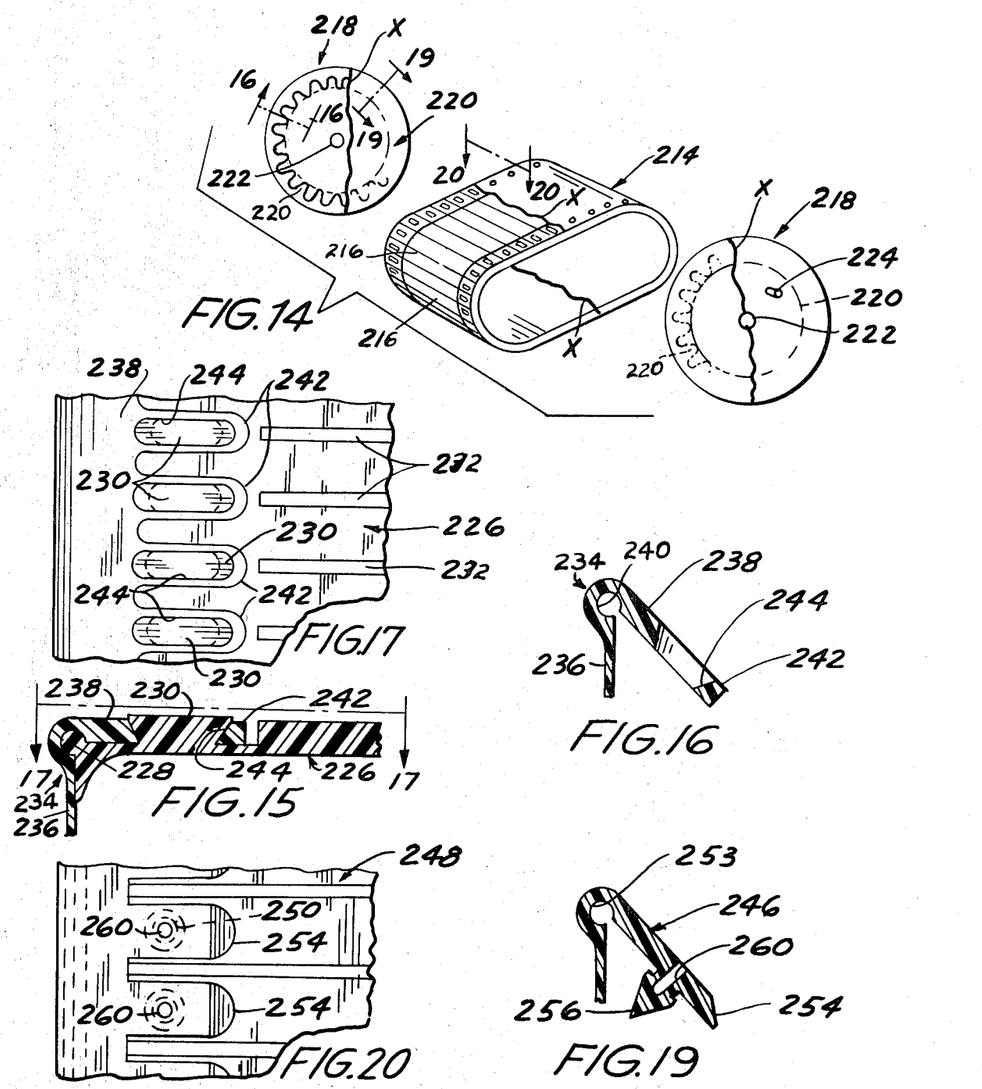
FIg. 14 is an exploded perspective view illustrating schematically the basic structural concept for hermetically sealing a hubless wheel locomotion apparatus, various modifications of which are contemplated by the invention.
FIG. 15 is an enlarged cross-sectional view on taken on the plane of line 15–15 of FIG. 4, looking in the direction of the arrows and illustrating one specific locomotion apparatus sealing means.
FIG. 16 is an enlarged cross-sectional view taken on the plane of line 16–16 of FIG. 14, looking in the direction of the arrows and illustrating an element of the sealing means shown by FIG. 15.
FIG. 17 is a top plan view taken on the plane of line 17–17 of FIG. 15, looking in the direction of the arrows.
FIG. 19 is an enlarged cross-sectional view taken on the plane of line 19–19 of FIG. 14, looking in the direction of the arrows and illustrating an element of the sealing means shown by FIG. 18.
FIG. 20 is a top plan view taken on the plane of line 20–20 of FIG. 18.

While the basic concept of a completely sealed tracklike locomotion apparatus was first disclosed in my previous application Ser. No. 684,141, an object of this invention is to provide other specific novel tread belt sealing means. FIG. 14 illustrates schematically only the general tread belt sealing concept, and FIGS. 15—17 and 18—20 illustrate in detail two specific sealing structures.

In FIG. 14, the tread belt 214 comprises an endless elastomeric (90—100 shore A, for example) belt having any desired thickness, a width somewhat greater than the length of the hubless elements, a circumference such that it may be stretched over the locomotion apparatus 46 and laterally extending traction cleats 216.

Sealing of the open sides of the tread belt 214 is possible due to the fact that the apparatus 46 is suspended on the single axis (shaft 158) of the load hub 152. The end sealing members 218 may comprise identical, relatively thin circular elements formed from a relatively softer elastomeric material (about 30—35 shore A, for example). The circumference of each of the members 218 is essentially equal to the circumference of the tread belt 214, with fingered portions 220 depending inwardly at an angle therefrom. Each element 218 is also formed with a central opening 222 adapted to receive an end shaft 158 of hub 152 and, if desired, a tire type valve 224 for purposes of inflating the sealed tread belt assembly.

It will be noted that FIGS. 4 and 14, which are only schematic illustrations, include broken lines X, the purpose thereof being to indicate alternate sealing structures in the same figure, for purposes of correlation with FIGS. 15—17 and 18—20, wherein different reference numerals are applied.

With the above in mind, FIGS. 15—17 illustrate the details of construction of the sealed tread belt structure shown by FIG. 6 and to the left of line X in FIGS. 4 and 14. It will be noted that each longitudinal half of the tread belt 226 is formed with a continuous bead 228 and a row of spaced undercut integral lugs 230 between the bead and the lateral traction cleats 232. The tread belt is, of course, constructed form any material that is reasonably resistant to wear and permanent distortion, yet sufficiently pliable to be stretched over and to roll with the hubless wheel locomotion apparatus.

Each of the end sealing members 234 are initially formed as a circular body 236 (similar to members 218 of FIG. 14) of relatively thin stretchable elastomer, the outer periphery thereof being molded as a thicker section 238 extending inwardly at any suitable angle, such as about 45°. A continuous circular inner groove 240 is formed to receive the bead 228, and the section 238 is formed with spaced separate fingers 242, there being the same number of fingers on sealing members 234 as there are lugs 230 on one side of the tread belt 226. Each finger has formed therein an opening 244 having a shape generally corresponding to the shape of a lug 230, but with a substantially lesser lateral dimension.

It will thus be apparent that e sealing is provided by assembling the tread belt 226 on the hubless wheel apparatus, applying each sealing member 234 to an open side of the belt 226 with the hub shaft 158 received in the central opening 222 (see FIG. 14) and then stretching the body 236 so that successive lugs 230 are received in successive openings 244, as shown in FIGS. 15 and 17. If desired, the sealed assembly may be lightly inflated through the valve 224 to prevent the thin body 236 from possibly rubbing on any portion of the sealed apparatus 46.

Figure 18:
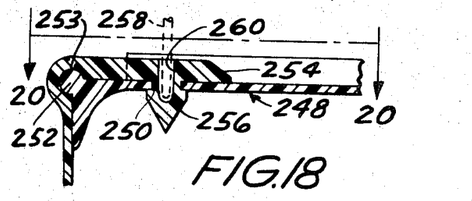
FIG. 18 is an enlarged cross-sectional view taken on the plane of line 18–18 of FIG. 4, looking in the direction of the arrows, and illustrating a modified locomotion apparatus sealing means.

FIGS. 18—20 correspond to FIGS. 15—17, except that they illustrate an alternate structure for attaching the closure members 246 to the tread belt 248. Instead of lugs 230, the belt 248 is formed at each edge thereof with a row of openings 250 adjacent the bead 252 received in groove 253. Similarly, instead of openings 244, the fingers 254 are formed with button protrusions each having a tapered head 256 larger than the openings 250 and adapted to be assembled in the openings by means of a tool 258 inserted into the axial opening 260.

Referring again to FIG. 2, it will be seen that if the power plant 172 is an internal combustion engine, the exhaust pipe may be formed with a branch 262 discharging to the atmosphere and fitted with a hinged weight closure 264 and a branch 266 discharging into compartment 44. When it is desired to traverse water, the door openings 26 are closed and the flotation tube 78 may be inflated, as described above. Further, the end of the exhaust branch 262 is closed by the weight 264, thereby restricting discharge of the exhaust to the atmosphere and forcing the exhaust to be discharged into the compartment 44 so as to lower to the water level in the compartment 44, as from line 268 to line 270, thus increasing the buoyancy of the vehicle 10 at the heavier engine end thereof.

Another substantial beneficial effect of such reduction of the water level in compartment 44 is that the upper portion of the locomotion apparatus 46 is then out of the water, resulting in a net propulsion of the vehicle in the forward direction. In vehicles wherein the tires or track are completely immersed in the water, the forward propulsion by the lower portion of the tire or track is counteracted by the rearward propulsion of the upper portion thereof, and other means, such as a propeller, must provide forward propulsion.

It is believed to be apparent from the above description that the invention provides a lightweight, high-performance amphibious vehicle characterized by structural features that substantially meet the previously stated objectives and provide other advantageous results.

To those skilled in the art to which this invention relates, many changes in construction and widely differing embodiments and applications of the invention will suggest themselves without departing from the spirit and scope of the invention. Thus, the disclosures and description herein are purely illustrative and are not intended to be in any sense limiting.

I claim:

1. A lightweight, amphibious, on and off road type vehicle, comprising a body, integrated front steering and suspension running gear means, and integrated rear suspension and running gear means, said rear running gear means comprising a driving hub and a plurality of surface locomotion wheels disposed on opposite sides of said hub, said hub and surface locomotion wheels being loaded ad and snubbered by oppositely applied endless belt means, said hub including ends being fixedly journaled with respect to said body.

2. A vehicle such as that recited in claim 1, wherein said hub is driven by power means.

3. A vehicle such as that recited in claim 2, wherein said power means comprises an engine mounted in said engine compartment, first roller means driven by said engine, second roller means driven from said first roller means and means for driving said hub from said second roller means, said second roller means being movable into driving engagement with said first roller means to provide a reverse drive for said hub.

4. A vehicle according to claim 4, wherein said front running gear means comprises an axle mounted wheel, a steering column extending from said axle, said column having a tapered section disposed in a rotatable tubular member having a spaced correspondingly tapered section and a compressible ring disposed in the radial clearance between said tapered sections, whereby relative axial movement between said column and said tubular member is resisted by resistance to compression of said ring for suspensions and rotation of said tubular member causes rotation of said column for steering.

5. A vehicle such as that recited in claim 4, wherein said tubular member has secured thereto a worm follower gear and a worm gear in mesh with said follower gear is secured to a steering member, including means to either rotate said worm gear or rotate said tubular member without rotating said worm gear, thereby providing steering with 360° freedom and reset capability.

6. A lightweight, amphibious, on and off road type vehicle according to claim 4, including a passenger compartment formed by said body, an engine compartment formed in said body rearwardly at a level beneath said engine compartment, said third compartment being sealed except for an open bottom, the upper portion of said surface locomotion wheels being disposed in said third compartment and the bottom portion of said surface locomotion wheels being disposed below said third compartment.

7. A vehicle according to claim 6, wherein said driving hub fixedly journaled with respect to said body comprises a single axis of suspension through which the vehicle weight at the rear thereof is transmitted to said belt means into said surface locomotion wheels, wherein said surface locomotion wheels are collectively translationally rotatable within said third compartment about said single axis, and wherein said third compartment includes means for limiting said collective translational rotation of said surface locomotion wheels about said single axis.

8. A vehicle such as that recited in claim 6, wherein an internal combustion engine is mounted in said engine compartment, the exhaust system of said engine normally discharging to atmosphere and having means for at all times discharging to said third compartment, when said vehicle is traversing water, said exhaust gas lowering the water level in said third compartment below the top of said rear means to eliminate propulsion thereof in opposition to propulsion by the bottom portion of said rear means.

9. A vehicle such as that recited in claim 6, wherein means is provided for lowering the water level in said third compartment when said vehicle is traversing water to a level below the top of said rear means to eliminate propulsion thereof in opposition to propulsion by the bottom portion of said rear means.

10. A lightweight, amphibious, on and off road type vehicle, comprising a body, integrated front steering and suspension running gear means, integrated rear suspension and running gear means, said front steering and suspension running gear means comprising a housing journaled within said body for rotation about a steering axis, a compressible element contained within said housing and situated therein as to be positioned about said steering axis, the resistance to compression of said element providing increasing-rate suspension means along said steering axis, and said compressible element further being effective to cause steering rotation of said front running gear about said steering axis by undergoing rotation effective to transfer therethrough steering rotation from said housing to said front running gear upon rotation of said housing within said body.

11. A lightweight, amphibious, on and off rod road type vehicle, comprising a body, integrated front steering and suspension running gear means, integrated rear suspension and running gear means, at least one door opening formed in said body, and a removable door for sealably closing said door opening, said body being formed from a lightweight material and including a floor, said door opening extending substantially to said floor so that said floor can flex, said floor being reinforced with a spring material thereby complimenting the front and rear suspension means and contributing to a softer ride.

12. A lightweight, amphibious, on and off road type vehicle, comprising a body, integrated front steering and suspension running gear means, and integrated rear suspension and running gear means, said body comprising first and second sidewalls on opposite sides thereof, first and second access door openings respectively formed in said first and second side walls, each of said first and second access door openings having spaced side edges and a lower disposed edge in at least close proximity to the floor of said body interconnecting said side edges and each of said access door openings being further characterized by being devoid of an upper disposed edge interconnecting said side edges, said first and second access door openings thereby functioning to localize bending stresses in a portion of said floor in the vicinity of said lower disposed edges in order to cause said portion of said floor to experience a controlled degree of flexing and thereby contribute to a softer ride of said vehicle, including first and second doors for at times respectively closing each of said first and second access door openings, and sealing means interposed generally between said first access door opening and said first door as well as between said second access door opening and said second door, said sealing means being effective to continue sealing action between respective access door openings and doors while permitting relative movement therebetween during such periods of vehicle operation as when said portion of said floor is experiencing said flexing.

13. A vehicle according to claim 12, wherein said sealing means comprises relatively resilient inflatable means situated between said doors and said edges of said access door openings, said inflatable means upon being inflated being effective to continue said sealing action while undergoing varying degrees of compression between said edges of said access openings and said doors while said portion of said floor is experiencing said flexing.

14. A lightweight, amphibious, on and off road type vehicle, comprising a body, integrated front steering and suspension running gear means, and integrated rear suspension and running gear means, said steering means comprising journaling means operatively carried by said body and connected to said running gear means for enabling rotation of said running gear means about the axis of rotation of said journaling means, manually operable steering control means operatively connected to said journaling means, said steering control means being effective upon manual movement thereof to cause corresponding rotation of said running gear means about said axis of rotation, and steering reset means operatively interconnecting said journaling means and said steering control means, said steering reset means being effective to at selected times permit said manual movement of said steering control means without causing said corresponding rotation of said front running gear means thereby enabling said steering control means to assume varying selected operating positions for every selected position of said front running gear means.

15. A lightweight, amphibious, on and off road type vehicle, comprising a body, integrated front steering and suspension running gear means, and integrated rear suspension and running gear means, said rear suspension and running gear means comprising rotatably power input means fixedly journaled with respect to said body transversely thereof, a plurality of surface locomotion wheels disposed on opposite sides of and in operative engagement with said rotatable power input means, endless vehicle weight load and power transmitting belt means applied generally about and operatively engaging said surface locomotion wheels and said rotatably power input means, said endless belt means being so looped about said surface locomotion wheels and said rotatable power input means as to cause said surface locomotion wheels and said rotatable power input means to be held in operative rolling engagement regardless of the attitude assumed by said surface locomotion wheels with respect to said body whenever said vehicle weight load is removed from said rotatable power input means as when upward acceleration is imparted to said vehicle body, and said power input means being effective to transmit said vehicle weight load at the rear portion of said vehicle directly through said endless belt means to said surface locomotion wheels, including tread belt means enveloping said rotatable power input means said endless load belt means and said surface locomotion wheels.

16. A lightweight, amphibious, on and off road type vehicle, comprising a body, integrated front steering and suspension running gear means, integrated rear suspension and running gear means, said rear suspension and running gear means comprising a rotatable power input member carried by said body and journaled for rotation about a fixed axis with respect thereto, at least two surface locomotion wheels respectively disposed on opposite sides of said rotatable power input member, belt means operatively looped about said surface locomotion wheels and said rotatable power input member in a manner causing said surface locomotion wheels and said rotatable power input member to become said integrated rear suspension and running gear means wherein said surface locomotion wheels are permitted to collectively assume inclined attitudes with respect to said body, an engine compartment formed in said body rearwardly of said passenger compartment, a third compartment formed in said body at a level beneath said engine compartment, said third compartment being sealed except for an open bottom the upper portion of said surface locomotion wheels being disposed in said third compartment and the bottom portion of said surface locomotion wheels being disposed below said third compartment, said fixed axis of rotation comprising a single axis of suspension through which vehicle weight at the rear thereof is transmitted to said rotatable power input member through said belt means into said surface locomotion wheels, said surface locomotion wheels being collectively translationally rotatable within said third compartment about said fixed axis, said third compartment including means for limiting said translational rotation of said surface locomotion wheels about said fixed axis, said means for limiting said translational rotation of said surface locomotion wheels comprises a rollerlike abutment member fixedly journaled with respect to said body so as to be generally within said third compartment and transversely disposed with respect to said body, said rollerlike member being adapted to operatively rollingly abuttingly engage said belt means in order to thereby limit translational rotation of said surface locomotion wheels about said fixed axis.

PO-1050
(5/69)

UNITED STATES PATENT OFFICE
CERTIFICATE OF CORRECTION

Patent No. 3,559,611          Dated February 2, 1971

Inventor(s) WALTON W. CUSHMAN

It is certified that error appears in the above-identified patent and that said Letters Patent are hereby corrected as shown below:

Column 2, line 5, delete "wither" and substitute therefor---either---.
Column 2, line 8, cancel "of" and substitute therefor---same-
Column 2, line 22, after "left" and before"end" delete "a".
Column 2, line 37, after "for" and before "vehicle" insert ---the---.
Column 4, line 7, delete second occurence of "inflatable".
Column 6, line 47, immediately after "elements" insert ---and
Column 7, line 7, cancel "1." and substitute therefor ---firs
Column 7, line 10, cancel "2." and substitute therefor---It--
Column 7, line 59, after "spaced" cancel "post".
Column 8, line 9, cancel "scaled" and substitute therefor---sealed---.
Column 8, line 19, immediately after "hubless" insert---wheel
Column 8, line 45, change "form" to ---from---.
Column 8, line 61, after "that" and before "sealing" delete "
Claim 1, line 7, after "loaded" and before "and" delete "ad".
Claim 4, line 1, after "claim" delete "4" and substitute ther ---1---.
Claim 6, line 2, after "claim" delete "4" and substitute therefor---1---.
Claim 6, line 4, after "rearwardly" and before "at" insert---of said passenger compartment, and a third compartment formed in said body---.
Claim 16, line 25, after "member" insert ---and---.

Signed and sealed this 24th day of August 1971.

(SEAL)
Attest:

EDWARD M. FLETCHER, JR.
Attesting Officer

WILLIAM E. SCHUYLER, JF
Commissioner of Patents